(12) United States Patent
Babu et al.

(10) Patent No.: US 12,437,631 B2
(45) Date of Patent: Oct. 7, 2025

(54) PRESENCE ALERT SYSTEM WITH IMAGING AND AUDIO SENSORS FOR REDUCING FALSE ALARMS

(71) Applicant: Carrier Corporation, Palm Beach Gardens, FL (US)

(72) Inventors: Ramesh Babu, Telangana (IN); Aditya Swami, Maharashtra (IN); Michael Ramoutar, Westford, MA (US); Ananthakrishnan N, Telangana (IN)

(73) Assignee: KIDDE FIRE PROTECTION, LLC, Bradenton, FL (US)

( * ) Notice: Subject to any disclaimer, the term of this patent is extended or adjusted under 35 U.S.C. 154(b) by 573 days.

(21) Appl. No.: 16/610,547

(22) PCT Filed: May 31, 2018

(86) PCT No.: PCT/US2018/035284
§ 371 (c)(1),
(2) Date: Nov. 4, 2019

(87) PCT Pub. No.: WO2018/222802
PCT Pub. Date: Dec. 6, 2018

(65) Prior Publication Data
US 2020/0090496 A1    Mar. 19, 2020

Related U.S. Application Data

(60) Provisional application No. 62/512,858, filed on May 31, 2017.

(51) Int. Cl.
*G08B 29/18* (2006.01)
*G06V 20/52* (2022.01)
(Continued)

(52) U.S. Cl.
CPC ........... *G08B 29/185* (2013.01); *G06V 20/52* (2022.01); *G06V 40/161* (2022.01);
(Continued)

(58) Field of Classification Search
CPC ............ G08B 13/19671; G08B 13/196; G08B 29/185; G08B 13/19684; G06K 9/00771;
(Continued)

(56) References Cited

U.S. PATENT DOCUMENTS

| 5,012,522 A | 4/1991 | Lambert |
|---|---|---|
| 5,991,429 A | 11/1999 | Coffin et al. |

(Continued)

FOREIGN PATENT DOCUMENTS

| CN | 103593648 A | 2/2014 |
|---|---|---|
| CN | 105006066 A | 10/2015 |

(Continued)

OTHER PUBLICATIONS

ISR for Application No. PCT/US2018/035284 dated Sep. 5, 2018; 15 pages.

*Primary Examiner* — Syed Haider
(74) *Attorney, Agent, or Firm* — CANTOR COLBURN LLP

(57) ABSTRACT

A presence alert system includes an imaging sensor, an audio sensor and a local control panel. The imaging sensor is configured to image a presence and output associated image data. The audio sensor is configured to record a voice of the presence and output associated voice data. The local control panel includes a processor and an electronic storage medium, and is configured to receive the image data and the voice data. The processor is configured to execute an analytics application for comparing the image data and the voice data to respective stored face coordinates and stored voice prints preprogrammed into the local control panel and (Continued)

stored in the electronic storage medium to reduce false alarms.

13 Claims, 4 Drawing Sheets

(51) Int. Cl.
    *G06V 40/16*           (2022.01)
    *G08B 13/196*         (2006.01)
    *G10L 17/00*           (2013.01)
    *G10L 17/06*           (2013.01)

(52) U.S. Cl.
    CPC ..... *G06V 40/172* (2022.01); *G08B 13/19671* (2013.01); *G10L 17/00* (2013.01); *G10L 17/06* (2013.01)

(58) Field of Classification Search
    CPC ............. G06K 9/00228; G06K 9/00288; G10L 17/00; G10L 17/06; G06V 20/52; G06V 40/161; G06V 40/172
    See application file for complete search history.

(56) References Cited

U.S. PATENT DOCUMENTS

| | | |
|---|---|---|
| 6,744,462 B2 | 6/2004 | Gutta et al. |
| 6,799,163 B2 | 9/2004 | Nolan |
| 7,697,735 B2 | 4/2010 | Adam et al. |
| 7,956,890 B2 | 6/2011 | Cheng et al. |
| 9,141,150 B1 | 9/2015 | Trundle et al. |
| 9,142,119 B1 | 9/2015 | Grant |
| 9,484,037 B2 | 11/2016 | Aley-Raz et al. |
| 9,536,410 B2 | 1/2017 | Hutz |
| 2005/0110637 A1 | 5/2005 | Rao |
| 2005/0134450 A1 | 6/2005 | Kovach |
| 2006/0103520 A1* | 5/2006 | Clark .................... G08B 29/123 340/506 |
| 2006/0227237 A1 | 10/2006 | Kienzle et al. |
| 2008/0278579 A1 | 11/2008 | Donovan et al. |
| 2010/0238286 A1* | 9/2010 | Boghossian ...... G08B 13/19697 348/143 |
| 2013/0057693 A1* | 3/2013 | Baranek ................ G06V 40/166 348/152 |
| 2014/0071273 A1* | 3/2014 | Balthasar ........... G06K 9/00248 348/143 |
| 2014/0313032 A1* | 10/2014 | Sager .................. G08B 25/008 340/539.17 |
| 2017/0109983 A1* | 4/2017 | Flint .................. H04M 1/0291 |
| 2017/0195640 A1* | 7/2017 | Pasternak ............. H04N 7/186 |

FOREIGN PATENT DOCUMENTS

| | | |
|---|---|---|
| WO | 2008016360 A1 | 2/2008 |
| WO | 2013147889 A1 | 10/2013 |
| WO | 2016034297 A1 | 3/2016 |

* cited by examiner

PRESENCE ALERT SYSTEM WITH IMAGING AND AUDIO SENSORS FOR REDUCING FALSE ALARMS

CROSS-REFERENCE TO RELATED APPLICATIONS

This is a National Stage Application of PCT/US2018/035284 filed May 31, 2018 which claims priority to U.S. Provisional Application No. 62/512,858 filed May 31, 2017, both of which are incorporated herein by reference in their entirety.

BACKGROUND

The present disclosure relates to an alert system, and more particularly, to a presence alert system configured to apply analytics to reduce false alarms.

Known presence control panels, such as intrusion security panels, may be electronic control devices configured to generally detect intrusions in for example, a building or area. Once the intrusion is detected, the intrusion security panel may report the intrusion to an end user or monitoring station. The intrusion alarms are typically transmitted as an event packet that may contain information about the zone triggered, number and sequence of zones, and the event date and time. Unfortunately, this information may not be sufficient for the end user, or monitoring station, to instruct or call emergency services or responders.

BRIEF DESCRIPTION

A presence alert system according to one, non-limiting, embodiment of the present disclosure includes an imaging sensor configured to image a presence and output associated image data; an audio sensor configured to record a voice of the presence and output associated voice data; and a local control panel including a processor and an electronic storage medium, wherein the local control panel is configured to receive the image data and the voice data, the processor is configured to execute an analytics application for comparing the image data and the voice data to respective stored face coordinates and stored voice prints preprogrammed into the local control panel and stored in the electronic storage medium to reduce false alarms.

Additionally to the foregoing embodiment, the analytics application is configured to convert the image data and the voice data into respective detected face coordinates and a detected voice print.

In the alternative or additionally thereto, in the foregoing embodiment, the presence alert system includes a remote station configured to receive a verified presence alarm message from the local control panel, wherein the local control panel is configured to generate a verified presence alarm message upon confirmation that at least one of the detected face coordinates do not compare to the stored face coordinates and the detected voice print does not compare to the stored voice print.

In the alternative or additionally thereto, in the foregoing embodiment, the verified presence alarm message includes the detected face coordinates and the detected voice print.

In the alternative or additionally thereto, in the foregoing embodiment, the presence alert system includes identification data accessible by the remote station for identifying a presence based on at least one of the detected face coordinates and the detected voice print.

In the alternative or additionally thereto, in the foregoing embodiment, the verified presence alarm message is less than about 100 bytes in size In the alternative or additionally thereto, in the foregoing embodiment, the presence alert system includes a low bandwidth network configured to provide communications between the local control panel and the remote station, wherein the verified presence alarm message is sent via the low bandwidth network.

In the alternative or additionally thereto, in the foregoing embodiment, the imaging sensor, the audio sensor and the local control panel is disposed in a building including at least one occupant, and the stored face coordinates and the stored voice prints are associated with the at least one occupant.

In the alternative or additionally thereto, in the foregoing embodiment, the presence alert system includes a mobile communications device configured to receive a false alarm notification from the local control panel upon confirmation that the detected face coordinates do not compare to the stored face coordinates and the detected voice print does not compare to the stored voice print.

In the alternative or additionally thereto, in the foregoing embodiment, the presence alert system includes a remote station configured to receive a verified presence alarm message from the local control panel, wherein the local control panel is configured to generate a verified presence alarm message upon confirmation that at least one of the detected face coordinates do not compare to the stored face coordinates and the detected voice print does not compare to the stored voice print.

A method of operating a presence alert system according to another, non-limiting, embodiment includes detecting a presence by at least one sensor; creating image data of the presence by the at least one sensor; creating voice data of the presence by the at least one sensor; comparing the image data and voice data to preprogrammed face coordinates and voice prints by a controller; and sending a presence alarm message to a remote station if the image and voice data generally does not match the preprogrammed face coordinates and voice prints.

Additionally to the foregoing embodiment, the method includes converting the image data and voice data to respective detected face coordinates and voice prints by an analytical application executed by the controller.

In the alternative or additionally thereto, in the foregoing embodiment, the detected face coordinates and the voice prints are sent to the remote station as part of the presence alarm message.

In the alternative or additionally thereto, in the foregoing embodiment, the method includes sending a false alarm notification to a mobile communication device if the image and voice data generally does not match the preprogrammed face coordinates and voice prints.

In the alternative or additionally thereto, in the foregoing embodiment, the at least one sensor and the controller are located in a common region that is remote from the remote station.

In the alternative or additionally thereto, in the foregoing embodiment, the preprogrammed face coordinates and the voice prints are associated with at least one occupant of the region.

In the alternative or additionally thereto, in the foregoing embodiment, the region is a building.

In the alternative or additionally thereto, in the foregoing embodiment, the controller is a local control panel including a processor and a computer writeable and readable storage medium.

In the alternative or additionally thereto, in the foregoing embodiment, the presence alert system is an intruder alert system.

The foregoing features and elements may be combined in various configurations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
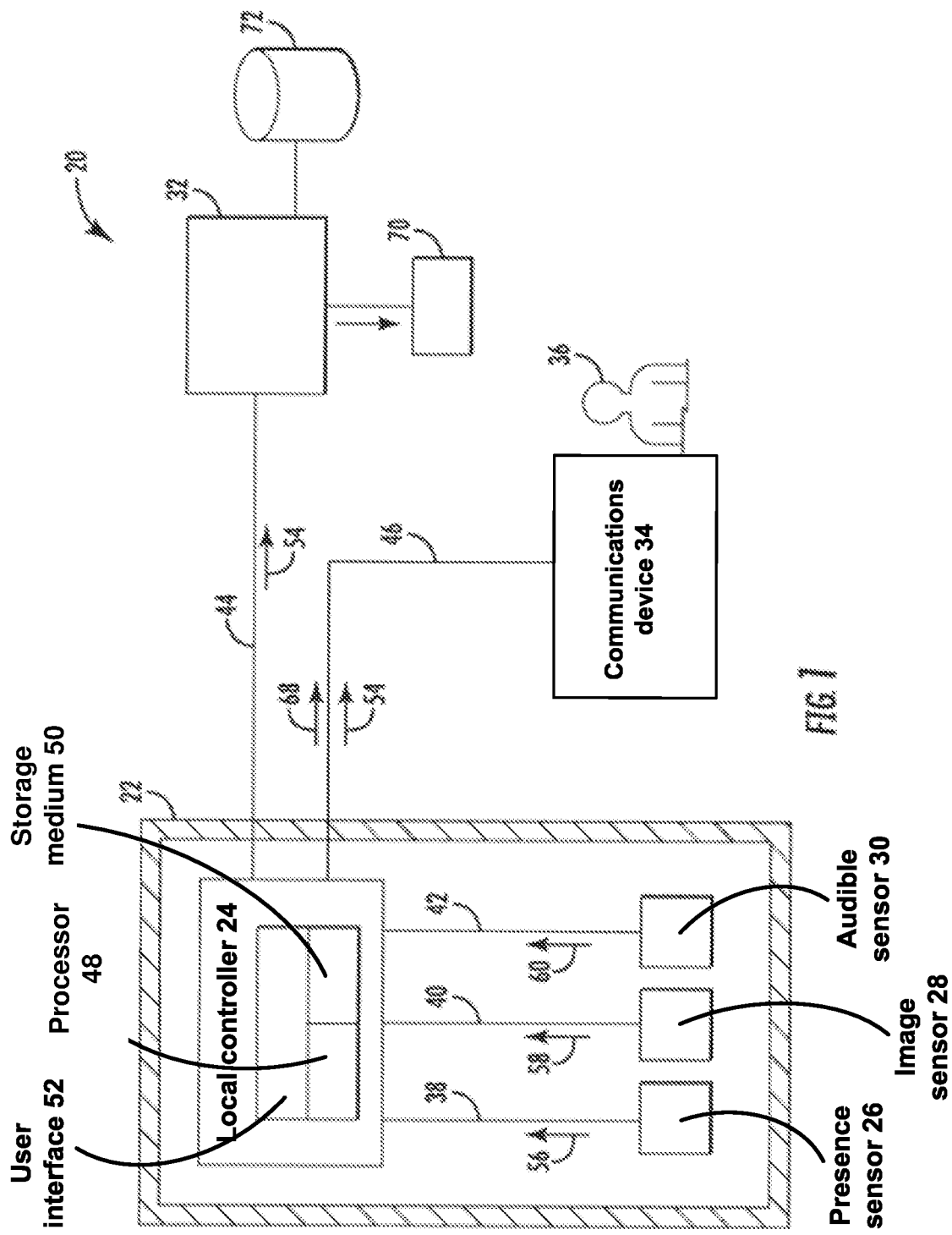
FIG. 1 is a schematic of an presence alert system as one, non-limiting, exemplary embodiment of the present disclosure.

Referring to FIG. 1, an exemplary embodiment of presence alert system 20 is illustrated as one, non-limiting, example. The presence alert system 20 may be constructed and arrange to monitor a region 22 (e.g., building) for the presence of, for example, an intruder. The presence alert system 20 may include a local controller 24, a presence sensor 26, an image sensor 28, an audible sensor 30 (i.e., voice sensor), a monitor station 32 that may be remote, and a communications device 34 for an end user 36. The sensors 26, 28, 30 may communicate with the controller 24 over respective pathways 38, 40, 42 that may be hardwired or wireless. The local controller 24 may communicate with the remote station 32 and the user communications device 34 over respective pathways 44, 46 that may be hard wired or wireless. In an embodiment where one or more of the pathways 38, 40, 42, 44, 46 are wireless, the associated components may include enabling transceivers.

In one example, the region 22 may be a home and the end user 36 may be an occupant of the home (e.g., the home owner). The local controller 24 may be a local control panel that may be mounted on, for example, an internal wall of the region or home 22 for easy access by the end user 36. The local controller 24 may include a processor 48, a storage medium 50 that may be computer writeable and readable, and a user interface 52. In another example, the user interface 52 of the controller 24 may generally be the panel, and the processor 48 and storage medium 50 may be located elsewhere in the region 22.

The remote station 32 may be an organization that provides a service of maintaining open communications with the controller 24 over pathway 44 for the purpose of responding to any verified presence alarm messages (see arrow 54) that may be received from the local controller 24. If the verified presence alarm message 54 is received by the remote station 32, the station may subsequently act by alerting local first responders (e.g., police).

The communications device 34 may be any device conveniently located for use by the end user 36. In one example, the communications device 34 may be a mobile device, and may further be a smart phone or tablet that may typically be carried by the end user. In another embodiment, the communications device 34 may be, or may optionally include, the user interface 52 of the controller 24.

The presence sensor 26 may be configured to provide the initial detection of a presence (e.g., human) that may later prove to be an intruder. When the presence is detected, the presence sensor 26 may send a detection signal (see arrow 56) to the local controller 24 via pathway 38. Examples of presence sensors 26 may include motion sensors, contact sensors, and others or combinations thereof. Upon receipt of the detection signal 56, the controller 24 may initiate, or awaken, the image sensor(s) 28 and the audible sensor(s) 30 to generally image and record the voice of the presence. In another embodiment, the presence sensor 26 may be part of, or may be, one of the image and audible sensors 28, 30. In yet another embodiment, the sensors 26, 28, 30 may communicate directly with one-another. It is contemplate and understood that the term "image sensor" may include a thermal camera or a thermal sensor.

When initiated, the image sensor 28 may send image data (see arrow 58) to the controller 24 over pathway 40. Similarly, the audible sensor 30 may send any recorded voice(s) as voice data (see arrow 60) over pathway 42. Examples of image sensors 28 may include image or video cameras, infrared cameras, and others. An examples of an audio sensor includes sound sensors (i.e., microphone based).

Figure 2:
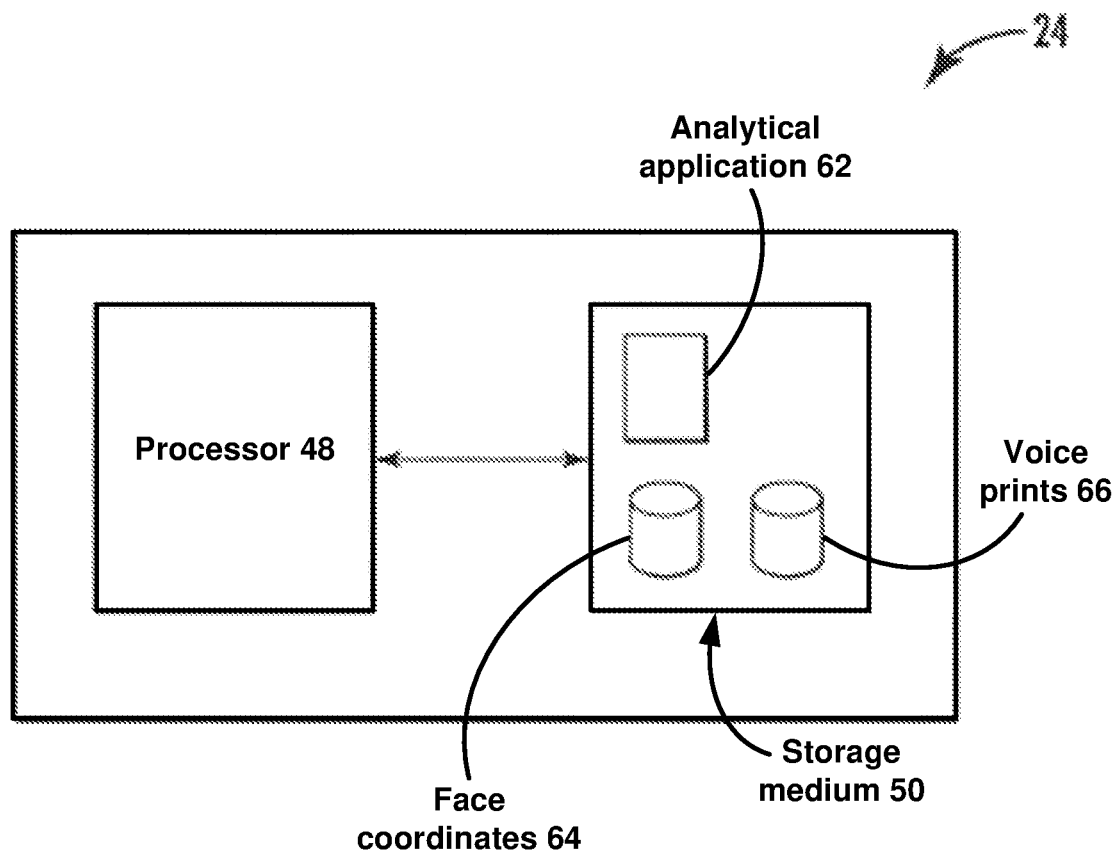
FIG. 2 is a schematic of a local controller of the presence alert system.

Referring to FIG. 2, the storage medium 50 of the controller 24 may be preprogrammed with an analytical application or module 62, stored face coordinates 64, and stored voice prints 66. The stored face coordinates 64 and the stored voice prints 66 are associated with the respective facial traits and voice patterns of individuals who have a reason to be present in the region 22, and are thus not deemed to be a presence (e.g., intruder). For example, the region 22 may be a home and the end user 36 may be the home owner. The facial traits and voice patterns of the home owner 36 may be preprogrammed into the storage medium 50 as respective stored face coordinates 64 and a stored voice print 66. Such preprogramming may also be conducted for family members, friends, neighbors, and other individuals not typically thought of as a potential intruder.

Figure 3A:
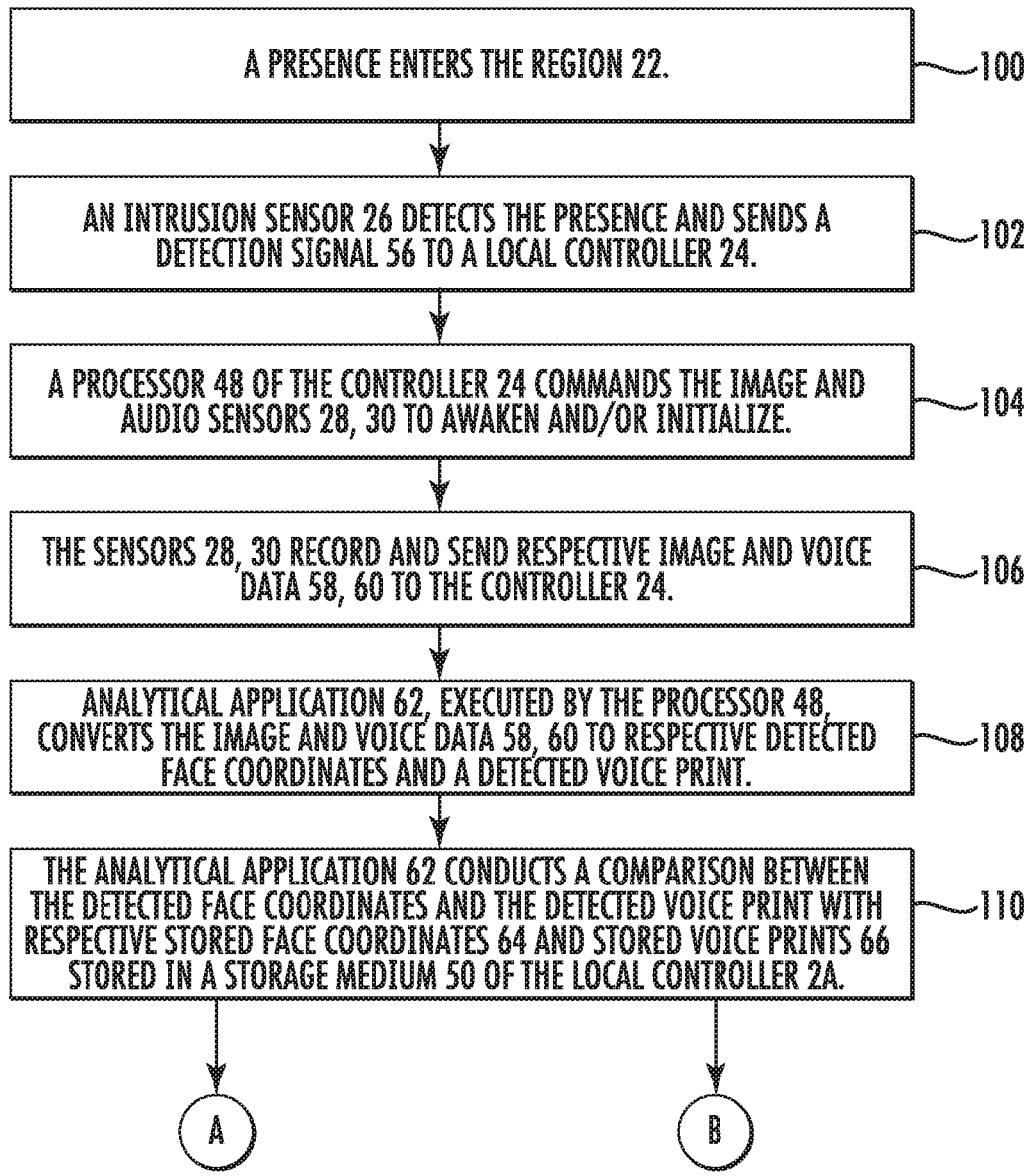
FIGS. 3A and 3B is a flow chart of a method of operating the presence alert system.
Figure 3B:
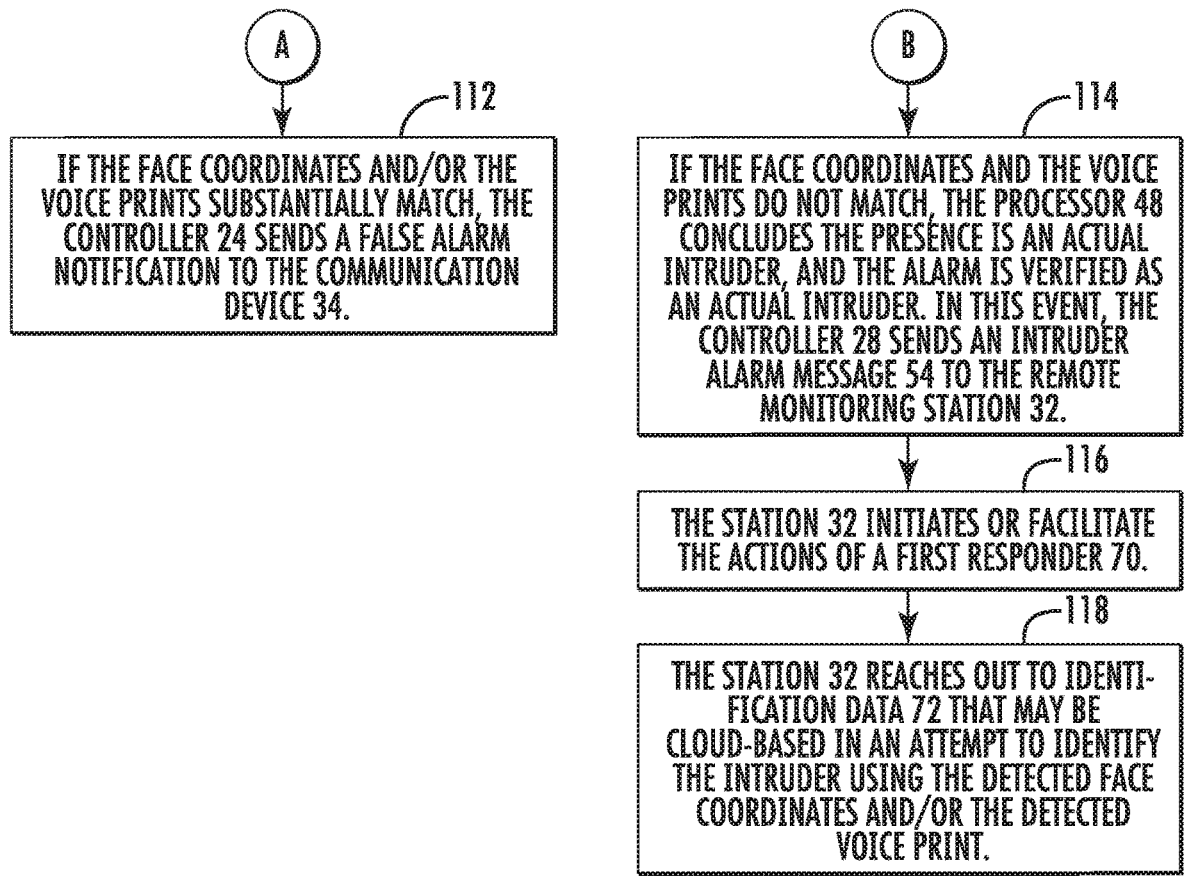

Referring to FIGS. 3A-3B and during operation of the presence alert system 20, at block 100, a presence may enter the region 22. At block 102, the presence sensor 26 may detect the presence and send the detection signal 56 to the controller 24. At block 104, the processor 48 of the controller 24 may command the image and audio sensors 28, 30 to awaken and/or initialize. At block 106, the sensors 28, 30 may record and send respective image and voice data 58, 60 to the controller 24.

At block 108, the analytical application 62 may be executed by the processor 48 that converts the image and voice data 58, 60 to respective detected face coordinates and a detected voice print. At block 110, the analytical application 62 may then conduct a comparison between the detected face coordinates and the detected voice print with the respective face coordinates 64 and the voice prints 66 being stored in the storage medium 50 of the local controller 24. At block 112 and if the face coordinates and/or the voice prints substantially match, the controller 24 may send a false alarm notification (see arrow 68 in FIG. 1) to the communication device 34. In one embodiment, no notification or message may be sent to the remote station 32. At block 114 and if the face coordinates and the voice prints do not match, the processor 48 may conclude the presence is an actual intruder, and the alarm (i.e., detection of the presence) is locally verified as an actual presence (e.g., intruder). In this event, the controller 28 may send a verified presence alarm message 54 (e.g., intruder alarm message, see FIG. 1) to the remote monitoring station 32. In one embodiment, the same message 54, or portions thereof, may be sent to the communications device 34.

The verified presence alarm message 54 may include the occurrence of a locally verified alarm, the location or address of the intrusion, and the current position and progression of the intruder. The message 54 may further include the face coordinates and voice print of the presence now verified as an intruder. Upon receipt of the verified presence alarm message 54 and at block 116, the station 32 may initiate or facilitate the actions of a first responder 70. At block 118, the station 32 may further reach out to identification data 72 that may be cloud based in an attempt to identify the intruder using the detected face coordinates and/or the detected voice print.

In one embodiment, at least the pathway 44 may be a low bandwidth network, or a network operating under a low bandwidth. Use of the low bandwidth network may be achievable because the image and voice data 58, 60 is processed locally by the local controller 24 into the detected face coordinates and detected voice prints, which may be much smaller in size with respect to computer memory and electronic communications. In one embodiment, the verified presence alarm message 54, which may include face coordinates and a voice print, may be less than about one-hundred (100) bytes.

The various functions described above may be implemented or supported by a computer program that is formed from computer readable program codes and that is embodied in a computer readable medium. Computer readable program codes may include source codes, object codes, executable codes, and others. Computer readable mediums may be any type of media capable of being accessed by a computer, and may include Read Only Memory (ROM), Random Access Memory (RAM), a hard disk drive, a compact disc (CD), a digital video disc (DVD), or other forms.

Terms used herein such as component, module, system, and the like are intended to refer to a computer-related entity, either hardware, a combination of hardware and software, or software execution. By way of example, a component may be, but is not limited to, a process running on a processor, a processor, an object, an executable, a thread of execution, a program, and/or a computer. It is understood that an application running on a server and the server may be a component. One or more components may reside within a process and/or thread of execution and a component may be localized on one computer and/or distributed between two or more computers Advantages and benefits of the present discloser include a reduction in false alarms, the creation of intruder facial and voice recognitions that may assist police authorities and emergency services, and a control panel based analytics application that processes image/video/audio input to a compressed output that is smaller in size (i.e., bytes) and can thus be sent over low bandwidth networks.

While the present disclosure is described with reference to exemplary embodiments, it will be understood by those skilled in the art that various changes may be made and equivalents may be substituted without departing from the scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

What is claimed is:

1. A presence alert system comprising:
   an imaging sensor configured to image a presence and output associated image data;
   an audio sensor configured to record a voice of the presence and output associated voice data; and
   a local control panel including a processor and an electronic storage medium;
   wherein the local control panel is configured to receive the image data and the voice data, the processor is configured to execute an analytics application for comparing the image data and the voice data to respective stored face coordinates and stored voice prints preprogrammed into the local control panel and stored in the electronic storage medium to reduce false alarms;
   wherein the analytics application is configured to convert the image data and the voice data into respective detected face coordinates and a detected voice print;
   wherein the local control panel is configured to generate and transmit a verified presence alarm message to a remote station upon confirmation that at least one of the detected face coordinates do not compare to the stored face coordinates and the detected voice print does not compare to the stored voice print;
   wherein the verified presence alarm message includes the detected face coordinates and the detected voice print;
   wherein the remote station is operable to initiate or facilitate actions of a first responder; and
   wherein the remote station is further operable to access identification data and use the identification data to attempt to identify the presence using the detected face coordinates and the detected voice print.

2. The presence alert system set forth in claim 1, wherein the verified presence alarm message is less than 100 bytes in size.

3. The presence alert system set forth in claim 2, further comprising:
   a low bandwidth network configured to provide communications between the local control panel and the remote station, wherein the verified presence alarm message is sent via the low bandwidth network.

4. The presence alert system set forth in claim 1, wherein the imaging sensor, the audio sensor and the local control panel is disposed in a building including at least one occupant, and the stored face coordinates and the stored voice prints are associated with the at least one occupant.

5. The presence alert system set forth in claim 1, further comprising:
   a mobile communications device configured to receive a false alarm notification from the local control panel upon confirmation that the detected face coordinates do compare to the stored face coordinates and the detected voice print does compare to the stored voice print.

6. A method of operating a presence alert system comprising:
   detecting a presence using a presence sensor;
   creating image data of the presence by an imaging sensor after the presence is detected by the presence sensor;
   creating voice data of the presence by an audio sensor;
   converting the image data and voice data to respective detected face coordinates and voice prints by an analytical application executed by the controller;

comparing the image data and voice data to preprogrammed face coordinates and voice prints by a controller; and sending a presence alarm message to a remote station if the image and voice data generally does not match the preprogrammed face coordinates and voice prints;

wherein the detected face coordinates and the voice prints are sent to the remote station as part of the presence alarm message;

wherein the remote station is operable to initiate or facilitate actions of a first responder; and wherein the remote station is further operable to access identification data and use the identification data to attempt to identify the presence using the detected face coordinates and the detected voice print.

7. The method set forth in claim 6, further comprising:

sending a false alarm notification to a mobile communication device if the image and voice data generally match the preprogrammed face coordinates and voice prints.

8. The method set forth in claim 6, wherein the presence sensor, the image sensor, the audio sensor, and the controller are located in a common region that is remote from the remote station.

9. The method set forth in claim 8, wherein the preprogrammed face coordinates and the voice prints are associated with at least one occupant of the region.

10. The method set forth in claim 9, wherein the region is a building.

11. The method set forth in claim 10, wherein the controller is a local control panel including a processor and a computer writeable and readable storage medium.

12. The method set forth in claim 6, wherein the presence alert system is an intruder alert system.

13. The presence alert system set forth in claim 5, wherein only the verified presence alarm and not the false alarm notification is sent to the remote station.

* * * * *